July 1, 1969     J. D. WHITE     3,452,469
CONSTANT TEMPERATURE BAIT BUCKET
Filed May 18, 1967
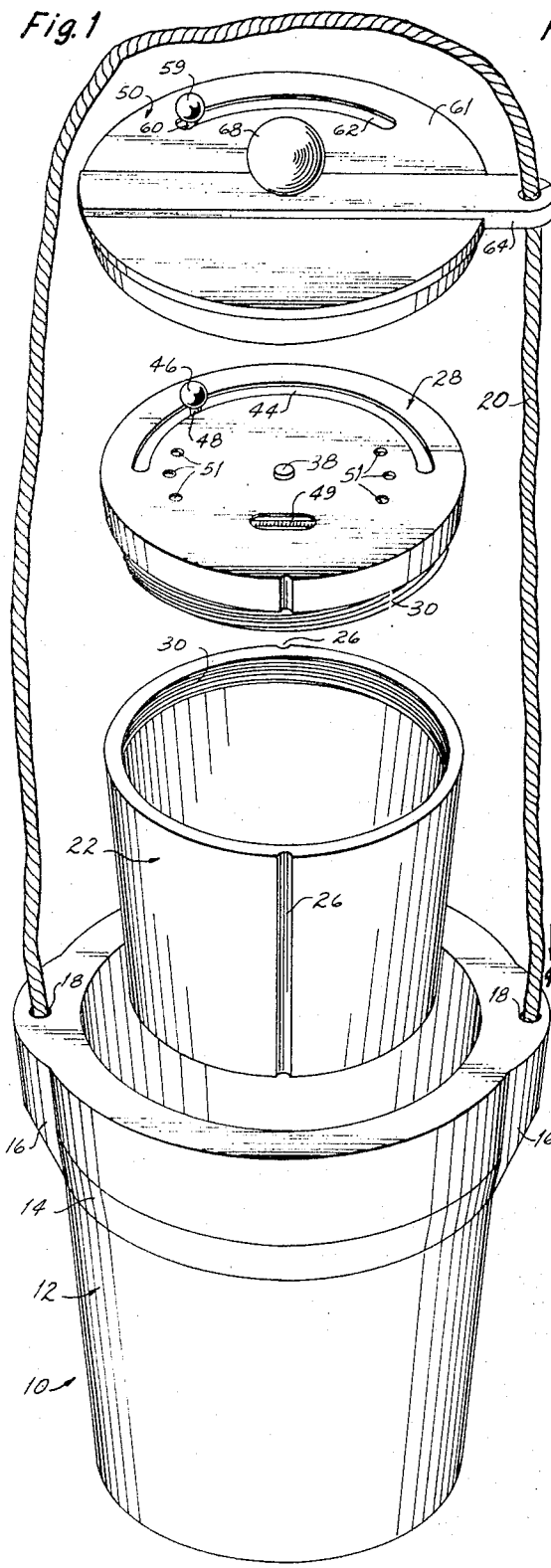
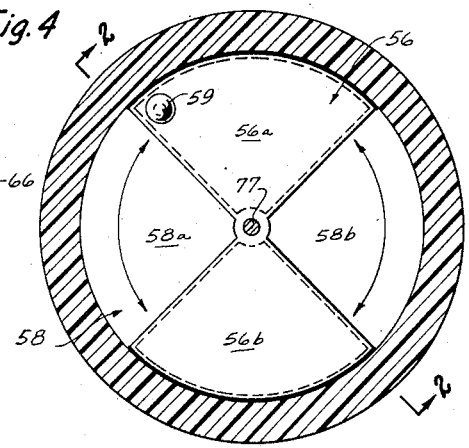
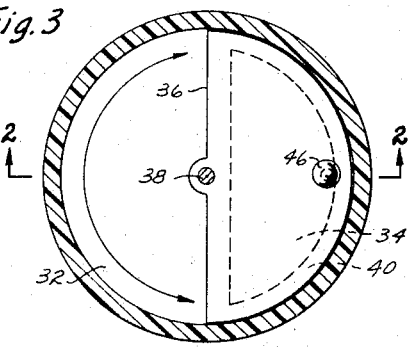
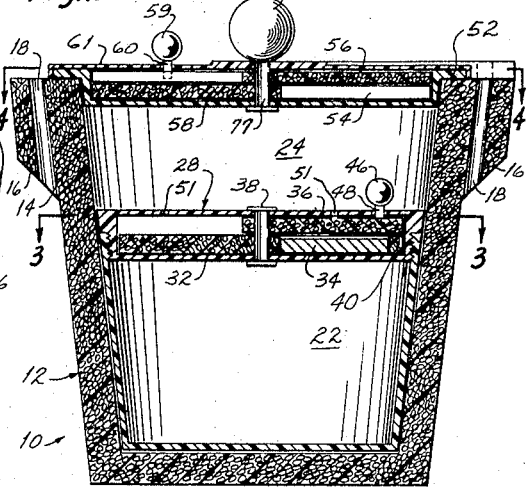
John D. White
INVENTOR.
BY Dominik, Stein + Knechtel
ATTORNEYS United States Patent Office 3,452,469
Patented July 1, 1969

3,452,469
CONSTANT TEMPERATURE BAIT BUCKET
John D. White, Tampa, Fla.
(6003 Chadwell Road SW., Huntsville, Ala. 35202)
Filed May 18, 1967, Ser. No. 639,519
Int. Cl. A01k *97/04;* F25d *3/08*
U.S. Cl. 43—55                                9 Claims

ABSTRACT OF THE DISCLOSURE

A constant temperature bait bucket which includes, generally one insulated container inside another. The inner container is filled with a cooling agent, and bait which is to be maintained at a constant temperature is placed within the upper cavity of the outer container above the inner container. Each container has an insulated top with a heat conductor therein. A manually controlled heat transfer means varies the rate of heat transfer through the heat conductor between the inner and outer container and between the outer container and the outside atmosphere.

---

This invention relates, in general, to improved constant temperature bait buckets.

It can be demonstrated that shrimp and other types of fish bait can be kept alive much longer at one specific optimum temperature for each type of bait. This temperature is generally lower than the surrounding water from which the bait is taken. The lower temperature reduced the bait's metabolism processes and, if the temperature is properly controlled, the bait can be kept alive for an unusually long length of time.

There are numerous different types of bait buckets available, however, none of them has any means for regulating the temperature of the bait chamber, as described above. For example, U.S. Patent 181,844 (1876) to Hitchcock discloses a container that functions as a combination bait bucket and lunch box which is fabricated of tin and has a number of compartments in it. One of the compartments is filled with ice and another compartment is filled with water and the bait. Still another compartment holds a lunch. The melting ice merely functions to cool the bait. Furthermore, the container is heavy and awkward to handle.

U.S. Patent 2,182,160 to Nelson likewise discloses a bait bucket fabricated of metal, having two telescoped pails within one another. The bait is placed in the inner pail. The inner pail has a lid or cover and is perforated to permit water to enter it. Crushed ice is placed on the inner pail's lid, and is used to cool the water within the bait bucket, as it melts. The minnow bucket of Nelson therefore suffers the same undesirable features as the container of Hitchcock.

U.S. Patent 2,243,498 to Candioto discloses still another bait bucket having a centrally disposed ice compartment which is radially surrounded by a number of other compartments for holding different kinds of bait. The melting ice or other temperature lower means functions to cool the bait. Accordingly, the bait bucket of Candioto, like those mentioned above, fails to provide any means for controlling or regulating the rate of heat transfer within the bait bucket to cool the bait.

The bait buckets disclosed in U.S. Patents 2,255,134 and 2,272,561 have the same disadvantage. With the bait bucket of the one patent, a jacket is formed about the bait container and the space between the jacket and the bait container is filled with a coolant such as cold water. In the other patent, a similar jacket is provided and the space between it and the bait container is filled with ice. The melting ice water flows into and combines with the water in the bait container, to preserve the bait.

Accordingly, an object of the present invention is to provide improved constant temperature bait buckets.

Another object is to provide improved bait buckets having a construction whereby the temperature for the environment for the bait can be maintained within an optimum temperature range for preserving the bait.

Still another object is to provide improved bait buckets which can be inexpensively manufactured and assembled.

A still further object is to provide improved bait buckets having a construction whereby the rate of heat transfer from the inner container or outside atmosphere to the outer bucket in which the bait is retained can be regulated to maintain the temperature of the bait within the optimum range for keeping the bait alive for a longer period of time.

Other objects of the invention will in part be obvious and will in part appear hereinafter.

The above objectives are accomplished with a constant temperature bucket which includes, generally, one insulated container inside another. The inner container is filled with ice, Dry Ice, or other cooling agent, and the objects which are to be maintained at a constant temperature are placed in the cavity within the outer container above the inner container. The inner container has an insulated top which has a heat conductor therein and an insulated shutter which is adjustably positionable with respect to the heat conductor to regulate the rate of heat transfer to the inner container from the outer container, and likewise to or from the outer container from or to the atmosphere through the insulated shutter in the top of the outer container. In this fashion, the temperature of the objects can be maintained substantially constant for relatively long periods of time.

The invention accordingly comprises an article of manufacture possessing the features, properties, and the relation of elements which will be exemplified in the article hereinafter described, and the scope of the invention will be indicated in the claims.

For a fuller understanding of the nature and objects of the invention, reference should be had to the following detailed description taken in connection with the accompanying drawings in which:

FIG. 1 is an exploded perspective view of a constant temperature bucket or bait bucket exemplary of the present invention;

FIG. 2 is a sectional view of the constant temperature bait bucket;

FIG. 3 is a sectional view taken along lines 3—3 of FIG. 2, illustrating the construction of the top for the inner container; and FIG. 4 is a sectional view taken along lines 4—4 of FIG. 2, illustrating the construction of the top for the outer container.

Similar reference characters refer to similar parts throughout the several views of the drawing.

Referring now to the drawing, in FIG. 1 there is shown a constant temperature bucket or bait bucket 10, hereinafter referred to generally as the bucket 10, having an outer container 12 which is preferably molded of an expanded plastic such as polystyrene, cellulose acetate or the like. The outer bucket 12 has an annular thickened portion 14 about its top for additional strength and advantageously may have a pair of diametrically opposed arcuate shaped flanges 16 having apertures 18 therein for receiving a rope 20 for carrying the bucket 10. The ends of the rope 20 are extended through the apertures 18 and a knot (not shown) is tied in the ends thereof for securing the rope to the bucket.

An inner container 22 preferably of a plastic such as polyethylene is removably contained within the outer bucket 12. The inner container 22 substantially corresponds to the configuration of the interior of the outer container 12, however, it is substantially shorter in length so as to provide a bait cavity 24 in the area above it when it is placed within the outer container 12. A pair of recessed slots 26 are formed in the outer wall of the inner container 22, from the upper edge to the lower edge thereof. The slots 26 function to break the vacuum between the inner container 22 and the outer container 12 so that the inner container can be easily removed. The grooves 26 also are plugged in any suitable fashion to prevent water from entering them, when the inner container 22 is placed in the outer container 12.

A lid 28 is removably affixed to the inner container 22, by means of the threads 30 or other suitable water-tight connections formed on the lid 28 and the inner container 22. The lid 28 preferably is formed of a plastic sheath such as polyethylene in the shape of a shallow hollow disk containing a metal pivot pin 38 through its center. Within the hollow of the disk are layers of expanded plastic insulation preferably about ½ inch thick. The bottom layer 32 is fixed and consists of a semicircular disk of insulation 32 adjacent to a semicircular disk of heat conducting metal 34. For economy, it is possible to utilize thin plastic in place o fthe metal and, in such instance, it may be molded integral with the walls of the inner container 22. The radius of the metal disk is slightly less than the radius of the semicircular disk of insulation to allow for edge insulation 40.

The top semicircular disk 36 consists of expanded plastic insulation and is movable, pivoting about the pivot pin 38 by which it rotates by a suitable yoke. The top disk 36 is positioned manually by means of a knob 46 attached to the disk and extending through a semicircular slot 44 through the plastic sheath. The arrangement is such that the top semicircular disk 36 can be positionably adjusted by rotating it with respect to the metal disk 34, by moving the knob 46 through the semicircular slot 44. The lid 28 has a thermometer 49 affixed to it so that the temperature of the water in the bait cavity 24 can be observed. Drain holes 51 avoid creation of vacuum under lid 28.

The outer container 12 also has a lid 50 which can be molded of an expanded plastic such as polystyrene; however, it is advantageously formed similar to the lid 28 and with a similar type shutter arrangement so as to provide a second means for regulating and maintaining the temperature of the water within the bait cavity 24. In this case, the lid 50 is adapted to seat within the top of the outer bucket 12 and has an enlarged diameter flange portion 52 which seats on the upper peripheral edge of the outer bucket 12. A recessed circular shaped cavity 54 is formed in the lid 50 and within the cavity 54 are two substantially semicircular shaped pieces of insulation 56 and 58 which are pivotally affixed atop one another by means of a pivot pin 57 and which are of complementary dimensions to close the top of the container. In the illustrated example, each of the pieces of insulation 56 and 58 is formed of two diametrically opposed one quarter of a circle segments 56a, 56b and 58a, 58b, respectively, which are affixed together at the apexes thereof and to the pivot pin 57. Other arrangements also can be used, if desired. The insulation 58 is fixedly secured within the lid 50 while the insulation 56 is adapted to be rotatably positionably adjustable with respect to it, by means of a knob 59 affixed to the insulation 56. A plastic cover 61 forms the upper part of the lid 50 by folding its peripheral edge annularly about the edge of the lid 50, and a stem 60 of the knob 59 is extended through an arcuate slot 62 in the plastic cover 61. The arcuate slot 62 preferably corresponds to approximately one quarter of a circle, so as to limit the movement of the insulation 56, with respect to the insulation 58. The lid 50 also advantageously is formed with a flange 64 having an aperture 66 therein, so that the rope 20 can be extended through the aperture 66 to secure the lid 50 and the outer bucket 12 together. A large knob 68 can be affixed to the end of the pivot pin 77, for removing the lid 50.

To use the bucket 10, the inner container 22 is filled with ice, Dry Ice or another cooling agent, the lid 28 is affixed to it by threading or otherwise affixing it to provide a water-tight seal therebetween, and the inner container placed within the outer container 12, as illustrated in FIG. 2. The bait and the water in which it is generally kept is placed in the outer container 12, atop the lid 28 of the inner container 22. The outer container 12 is then closed with the lid 50.

The rate of heat transfer to the inner container 22 from the outer container 12, or more specifically, from the water and the bait within the bait cavity 24, is regulated by rotatably adjustably positioning the insulation 36 with respect to the metal plate 34. The metal plate 34 is cooled by the coolant within the inner container 22, and functions as a cooling means. Accordingly, by adjustably positioning the insulation 36 to expose a greater or lesser amount of its area, the rate of heat transfer to the metal plate from the water and the bait can be regulated and maintained at the optimum temperature for keeping the bait alive. The temperature of the water and the bait is easily determined by reference to the thermometer 49 affixed to the lid 28. The insulation 36 is adjustably positioned by removing the lid 50 and by slidably moving the knob 46 witthin the arcuate slot 44.

If the lid 50 for the outer container 12 is provided with a shutter arrangement, such as the insulation 56 and 58, the temperature of the water and the bait can be further regulated and maintained substantially constant. With the illustrated arrangement, the insulation 56 is positionally adjusted with respect to the insulation 58, to permit transfer of heat through the lid 50.

In a particular application, three dozen shrimp were placed in water in the bait cavity 24 and the inner container 22 was filled with ice. The temperature of the water and the shrimp was maintained substantially constant at approximately 57° by positionally adjusting the insulation 36 to regulate the rate of heat transfer through the metal plate 34 to the water. The shrimp was preserved for three days, in this fashion.

The outer container 12 can have a capacity of six quarts and, in such case, the inner container 22, preferably has a capacity of 2½ quarts. The bucket 10 therefore is generally of the size presently used, and is easily carried.

The inner container 22 also is preferably weighted or secured against flotation within the outer container 12. This can be easily accomplished by forming the cover 40 on the lid 28 of metal so that it has sufficient weight to prevent the inner container from floating. The plugs (not shown) used to plug the slots 26 also can function to secure the inner container against flotation. Many other obvious expedients also can be used.

It may be further noted that although the bucket 10 makes an excellent bait bucket, its use is not limited to such an application, for its principle of operation can be used to maintain any object which is placed therein at a substantially constant temperature. Accordingly, in broad concept, it is a constant temperature bucket.

It will thus be seen that the objects set forth above, among those made apparent from the preceding description, are efficiently attained and, since certain changes may be made in the above article without departing from the scope of the invention, it is intended that all matter contained in the above description or shown in the accompanying drawing shall be interpreted as illustrative and not in a limiting sense.

I claim:

1. A constant temperature bucket adapted to retain heat absorbing means such as a coolant and objects such as fish bait or other articles, for maintaining said objects at an established constant temperature for a period of time comprising, in combination: an outer container having a lid for closing it; a smaller inner container within said outer container having a lid for closing it, said inner container's lid including first insulating means substantially coextensive with the open top of said inner container and having a heat conductor therein which is cooled by said heat absorbing means and which is operable to transfer heat from one of said containers to the other and second insulating means affixed atop and adjustable positionally with respect to said heat conductor to expose a greater or lesser amount of the area of said heat conductor to regulate the rate of heat transfer from said one container to the other, whereby the temperature of said objects when placed within one of said containers with the heat absorbing means in the other one of said containers can be maintained substantially constant for a period of time.

2. The constant temperature bucket of claim 1, wherein said heat absorbing means is retained within said inner container and said objects are retained within said outer container between its lid and said inner container.

3. The constant temperature bucket of claim 2, wherein said first insulating means comprises a circular-shaped disk of foamed plastic having a substantially semicircular shaped metallic plate means therein, said metallic plate means functioning as said heat sink, said second insulating means comprising a semicircular shaped disk of foamed plastic which has dimensions to completely overlie said metallic plate means and which is rotatably affixed atop said circular-shaped disk forming said first insulating means and adjustably positionable with respect to it so as to expose a greater or lesser amount of the area of said metallic plate means.

4. The constant temperature bucket of clim 3, further including a cover on said inner container's lid having an arcuate slot therein, post means extending through said slot and affixed to said second insulating means for positionably adjusting said second insulating means.

5. The constant temperature bucket of claim 1 wherein said inner container is of dimensions substantially corresponding to the interior of said outer container so as to seat within the lower portion thereof and to provide an object cavity within said outer container between its lid and the lid of said inner container.

6. The constant temperature bucket of claim 5, wherein said inner container has at least one recessed groove in its exterior sidewall extending from the top to the bottom of said inner container for breaking the vacuum created between said inner and outer container, whereby said inner container can be easily removed.

7. The constant temperature bucket of claim 2, wherein said outer container's lid includes first and second insulating means of complementary dimensions so that together they are substantially coextensive with the open top of said outer container, at least one of said first and second insulating means being adjustably positionable with respect to the other to permit transfer of heat through said outer container's lid, to thereby provide second means for regulating the temperature of said objects within the outer container between its lid and the inner container to maintain the temperature substantially constant for a period of time.

8. The constant temperature bucket of claim 1 wherein said outer container is molded of a foamed plastic and said inner container is molded of rigid plastic.

9. The constant temperature bucket of claim 8 wherein said foamed and rigid plastic comprises polystyrene and polyethylene, respectively.

References Cited

UNITED STATES PATENTS

| | | | |
|---|---|---|---|
| 2,039,817 | 5/1936 | MacMillan | 62—383 |
| 2,673,454 | 3/1954 | Gallie et al. | 43—56 X |
| 2,680,424 | 6/1954 | Brown | 43—55 X |
| 2,850,885 | 9/1958 | Mohr et al. | 62—372 |

HUGH R. CHAMBLEE, *Primary Examiner.*

U.S. Cl. X.R.

62—372, 383